(12) United States Patent
Goldberg et al.

(10) Patent No.: US 10,173,776 B2
(45) Date of Patent: Jan. 8, 2019

(54) AERIAL DRONE FOR DEPLOYING A WARNING SIGN

(71) Applicant: International Business Machines Corporation, Armonk, NY (US)

(72) Inventors: Itzhack Goldberg, Hadera (IL); Sharathchandra U. Pankanti, Darien, CT (US); Erik Rueger, Ockenheim (DE); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 15/246,777

(22) Filed: Aug. 25, 2016

(65) Prior Publication Data

US 2018/0061235 A1     Mar. 1, 2018

(51) Int. Cl.
| | |
|---|---|
| *B64D 1/02* | (2006.01) |
| *B64D 1/22* | (2006.01) |
| *G05D 1/00* | (2006.01) |
| *G05D 1/10* | (2006.01) |
| *G08G 5/00* | (2006.01) |
| *B64C 39/02* | (2006.01) |
| *B64D 47/06* | (2006.01) |

(Continued)

(52) U.S. Cl.
CPC .............. *B64D 1/22* (2013.01); *B64C 39/024* (2013.01); *B64D 1/02* (2013.01); *B64D 47/06* (2013.01); *B64D 47/08* (2013.01); *G05D 1/0011* (2013.01); *G05D 1/101* (2013.01); *G08G 1/0955* (2013.01); *G08G 5/0069* (2013.01); *B64C 2201/12* (2013.01)

(58) Field of Classification Search
CPC .......... G08G 1/16; G08G 1/161; G08G 1/166; G08G 5/0069; B64C 39/024; B64D 1/00; B64D 1/02; B64D 47/06; G05D 1/0011; G05D 1/101
USPC ........................................................ 701/16
See application file for complete search history.

(56) References Cited

U.S. PATENT DOCUMENTS

| | | |
|---|---|---|
| 2004/0130463 A1 | 7/2004 | Bloomquist et al. |
| 2005/0046596 A1 | 3/2005 | Nelson |

(Continued)

FOREIGN PATENT DOCUMENTS

| | | |
|---|---|---|
| CN | 2558421 Y | 7/2003 |
| EP | 002838078 A1 | 2/2015 |

(Continued)

OTHER PUBLICATIONS

Baker et al. "Effectiveness of Truck Rollover Warning Systems", Transportation Research Record: Journal of the Transportation Research Board 1779 (2001): pp. 134-140.

(Continued)

*Primary Examiner* — Krishnan Ramesh
(74) *Attorney, Agent, or Firm* — Law Office of Jim Boice

(57) ABSTRACT

An aerial drone is coupled to a warning sign for warning other vehicles of a presence of a faulty vehicle. The aerial drone is positioned at a location of the faulty vehicle, in response to detecting the faulty vehicle. The aerial drone assesses environmental conditions at the location of the faulty vehicle. An optimal position for positioning the warning sign is determined, based on the environmental conditions at the location of the faulty vehicle, and the aerial drone is positioned at the optimal position.

19 Claims, 7 Drawing Sheets

(51) Int. Cl.
*B64D 47/08* (2006.01)
*G08G 1/0955* (2006.01)

(56) References Cited

U.S. PATENT DOCUMENTS

| | | |
|---|---|---|
| 2015/0040445 A1 | 2/2015 | Li |
| 2015/0073623 A1 | 3/2015 | Zhang |
| 2016/0059962 A1* | 3/2016 | Abuelsaad ....... G08G 1/096716 701/3 |
| 2016/0272317 A1* | 9/2016 | Cho .......................... G08G 1/09 |
| 2017/0349283 A1* | 12/2017 | Paunicka ................. B64D 5/00 |
| 2018/0029706 A1* | 2/2018 | Baruch ................. H04W 76/14 |

FOREIGN PATENT DOCUMENTS

| | | |
|---|---|---|
| EP | 002860313 A1 | 4/2015 |
| WO | 2012155534 A1 | 11/2012 |

OTHER PUBLICATIONS

Chan et al. "Evaluation of Cooperative Roadside and Vehicle-Based Data Collection for Assessing Intersection Conflicts", Inteligent Vehicles Symposium, 2005. Proceedings. IEEE. IEEE, 2005.
P. Mell et al., "The NIST Definition of Cloud Computing", National Institute of Standards and Technology, Information Technology Laboratory, Sep. 2011, pp. 1-7.

\* cited by examiner

AERIAL DRONE FOR DEPLOYING A WARNING SIGN

BACKGROUND

The present disclosure relates to the field of aerial drones, and specifically to aerial drones that are capable of transporting a payload. More specifically, the present disclosure relates to the use of an aerial drone to deploy a sign warning of the presence of a faulty vehicle.

An aerial drone, also known as an unmanned aerial vehicle (UAV) or a flying drone, is an unmanned airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

In one or more embodiments of the present invention, a method utilizes an aerial drone to position a warning sign at the location of a faulty vehicle. One or more processor(s) detect a faulty vehicle. The processor(s) position an aerial drone at a location of the faulty vehicle. The aerial drone is coupled to a warning sign that warns other vehicles of a presence of the faulty vehicle. In response to arriving at the location of the faulty vehicle, the aerial drone assesses environmental conditions at the location of the faulty vehicle. An optimal position for positioning the warning sign, based on the environmental conditions at the location of the faulty vehicle, is determined by the processor(s), which also position the aerial drone at the optimal position.

The aforementioned invention may also be implemented as a system and/or computer program product.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
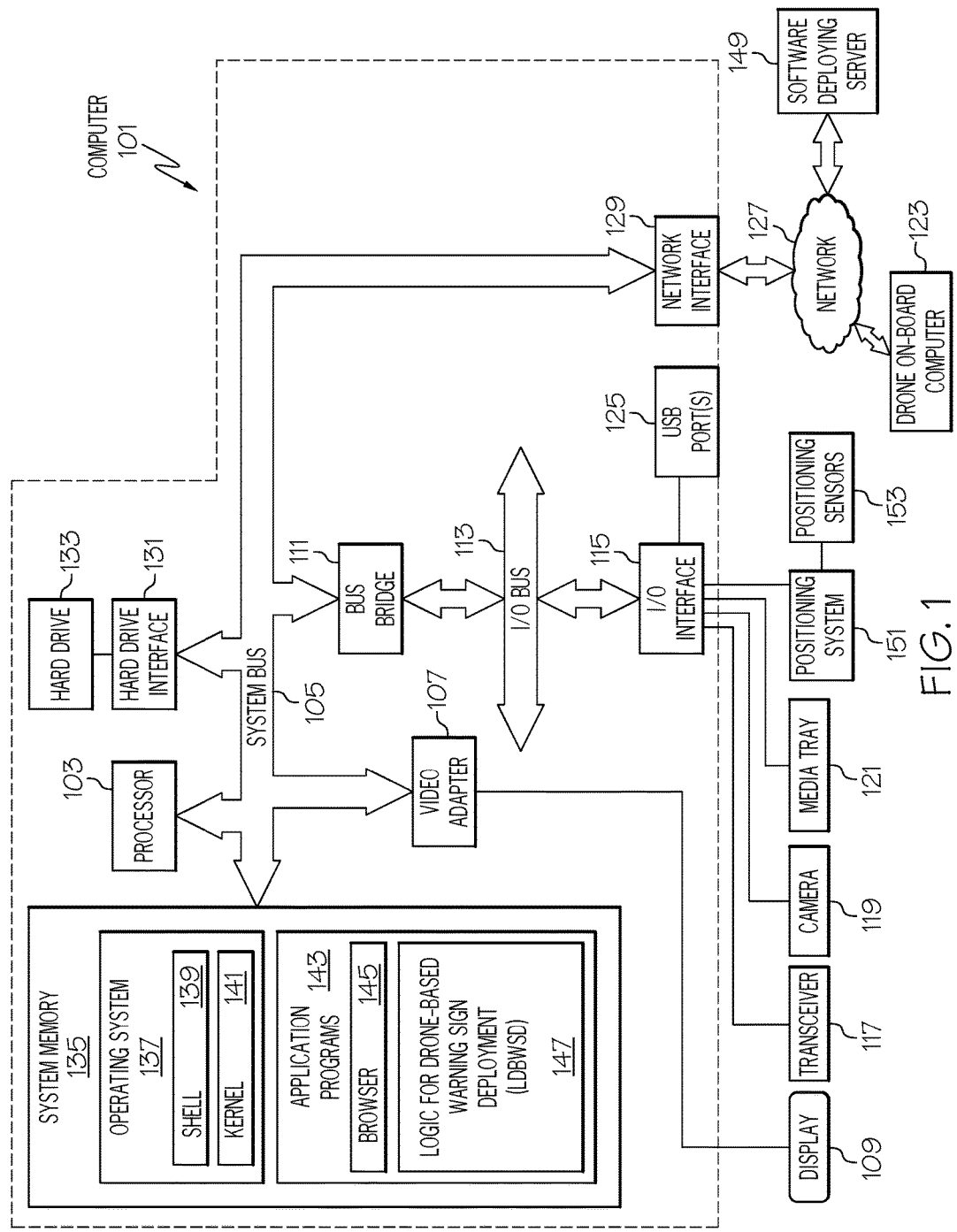
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or positioning system 151, and/or drone on-board computer 223 shown in FIG. 2, and/or drone on-board computer 323 shown in FIG. 3, and/or drone controller device 401 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a transceiver 117 (capable of transmitting and receiving electromagnetic transmissions), a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, an aerial drone 200 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is also able to communicate (besides via transceiver 117) with a software deploying server 149 and/or other devices/systems (e.g., drone on-board computer 123 and/or a software deploying server 149) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Drone-Based Warning Sign Deployment (LDBWSD) 147. LDBWSD 147 includes code for implementing the processes described below, including those described in FIGS. 2-5. In one embodiment, computer 101 is able to download LDBWSD 147 from software deploying server 149, including in an on-demand basis. In one embodiment, software deploying server 149 is able to execute one or more instructions from LDBWSD 147 and provide the results to computer 101, thus relieving computer 101 from the need to utilize its internal processing power.

The hardware elements depicted in computer 101 are not intended to be exhaustive, but rather are to highlight certain components used in some embodiments of the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
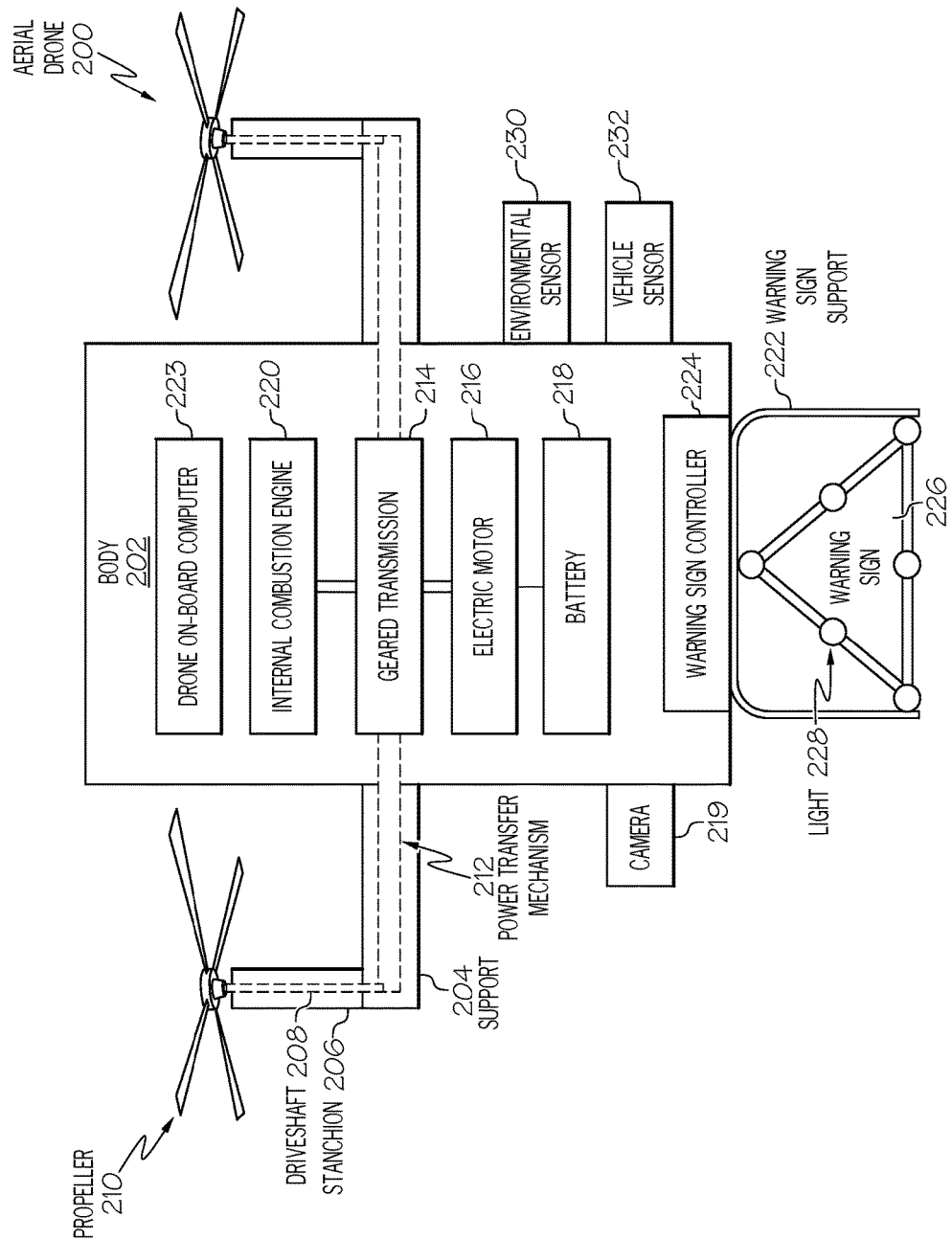
FIG. 2 depicts detail of an exemplary aerial drone as used in accordance with one or more embodiments of the present invention.

FIG. 2 illustrates an exemplary aerial drone 200 in accordance with one or more embodiments of the present invention. The terms "aerial drone", "drone", and "unmanned aerial vehicle" ("UAV") are used interchangeably herein to identify and describe an airborne vehicle that is capable of pilot-less flight.

As shown in FIG. 2, aerial drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned, thus providing lift and steering to the aerial drone 200. Geared transmission 214 preferably contains a plurality of gears, such that a gear ratio inside geared transmission 214 can be selectively changed.

Power to the geared transmission 214 is selectively provided by an electric motor 216 (which is supplied with electrical power by a battery 218) or an internal combustion engine 220, which burns fuel from a fuel tank (not shown). In one or more embodiments of the present invention, the internal combustion engine 220 has greater power than the electric motor 216, since internal combustion engines are able to produce greater torque/power and have a greater range (can fly farther) than electric motors of the same size/weight.

Affixed to body 202 is a warning sign support 222 that holds a warning sign 226. Warning sign support 222 may include hinges that allow the warning sign 226 to be picked up and/or released from the aerial drone 200. For example, a warning sign controller 224 may be able to release a spring-loaded catch (not shown) to allow the warning sign 226 to be dropped away from the aerial drone 200.

Warning sign 226 is a physical sign that warns of a hazard, such as a faulty vehicle on a roadway. The warning sign controller 224 is able to turn on lights (e.g., light 228) on the warning sign 226; cause the warning sign support 222 to swivel, thus causing the warning sign 226 to face in a certain direction (e.g., towards oncoming traffic) rather than moving the aerial drone 200 itself (e.g., in the case of the aerial drone 200 having landed on the ground); pick up and release the warning sign 226 (as described above), etc.

Also affixed to body 202 is a camera 219 (analogous to camera 119 shown in FIG. 1), which is able to take digital still and moving pictures under the control of the drone on-board computer 223.

Also affixed to body 202 is an environmental sensor 230, which is communicatively coupled to drone on-board computer 223. Environmental sensor 230 detects ambient conditions around the aerial drone 200. For example, environmental sensor 230 may be a light sensor that detects ambient lighting conditions; environmental sensor 230 may be a weather sensor that detects ambient weather conditions such as rain, snow, fog, etc. using one or more of a thermometer, barometer, microphone camera, moisture detector, etc.; environmental sensor 230 may be a traffic sensor that detects ambient traffic conditions using a light sensor (for detecting oncoming headlights), a microphone (for detecting the sound of traffic), a camera (for photographing local traffic), etc.

Also affixed to aerial drone 200 is a vehicle sensor 232. While environmental sensor 230 can detect traffic conditions (i.e., general pattern of local traffic), vehicle sensor 232 detects an individual oncoming vehicle and its state. For example, vehicle sensor 232 may be a Doppler-enabled transceiver that sends and receives an electromagnetic signal towards an oncoming vehicle (which is detected by camera 219), in order to detect the speed, direction, and current location of the oncoming vehicle.

Figure 3:
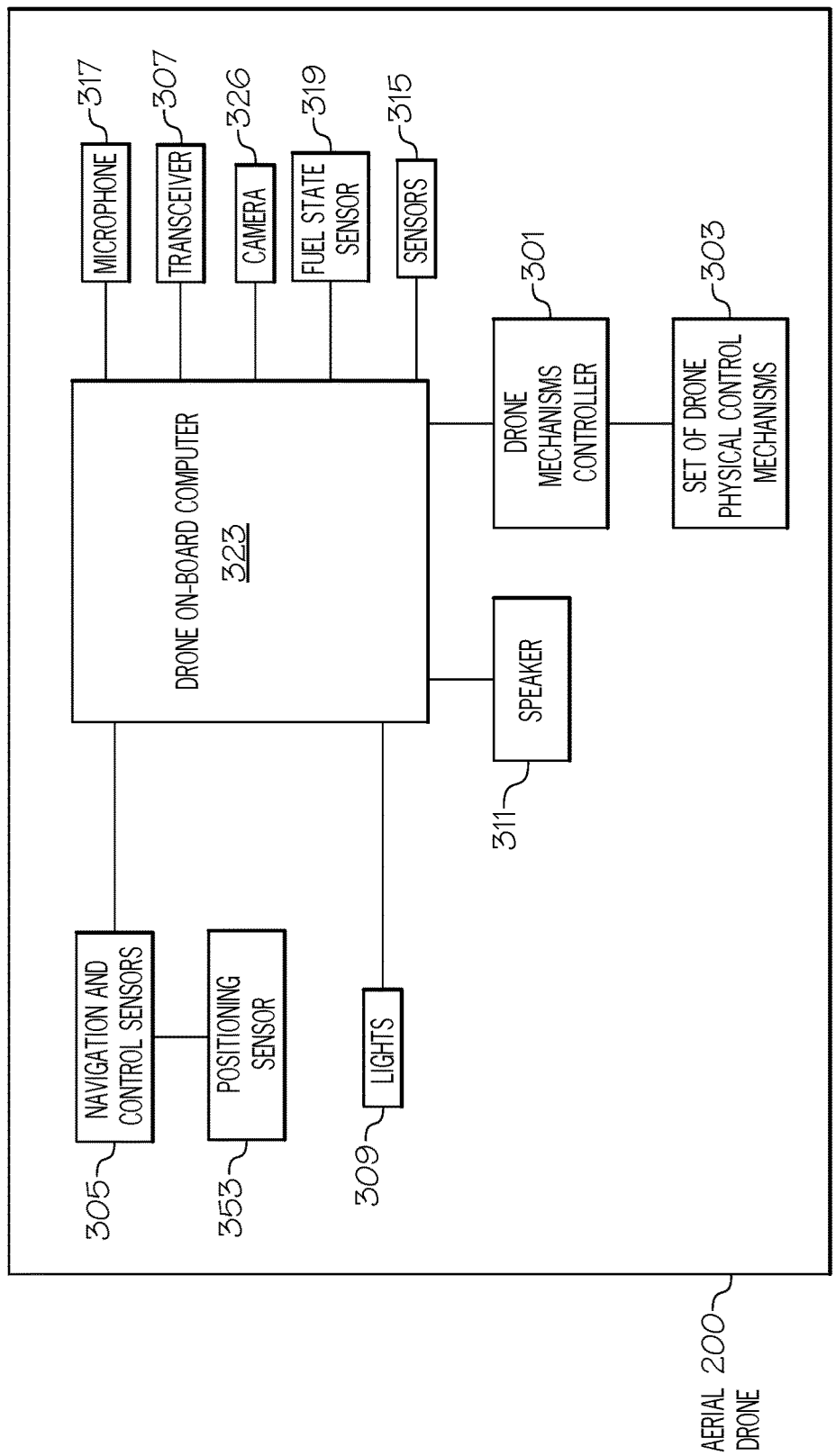
FIG. 3 illustrates control hardware and other hardware features of an exemplary aerial drone in accordance with one or more embodiments of the present invention.

With reference now to FIG. 3, exemplary control hardware within the aerial drone 200 presented in FIG. 2 is depicted.

A drone on-board computer 323 (analogous to drone on-board computer 223 shown in FIG. 2) controls a drone mechanisms controller 301, which is a computing device that controls a set of drone physical control mechanisms 303. The set of drone physical control mechanisms 303 includes, but is not limited to, throttles for internal combustion engine 220 and/or electric motor 216, selectors for selecting gear ratios within the geared transmission 214, controls for adjusting the pitch, roll, and angle of attack of propellers such as propeller 210 and other controls used to control the operation and movement of the aerial drone 200 depicted in FIG. 2.

Whether in autonomous mode or remotely-piloted mode, the drone on-board computer 323 controls the operation of aerial drone 200. This control includes the use of outputs from navigation and control sensors 305 to control the aerial drone 200. Navigation and control sensors 305 include hardware sensors that (1) determine the location of the aerial drone 200; (2) sense other aerial drones and/or obstacles and/or physical structures around aerial drone 200; (3) measure the speed and direction of the aerial drone 200; and (4) provide any other inputs needed to safely control the movement of the aerial drone 200.

With respect to the feature of (1) determining the location of the aerial drone 200, this is achieved in one or more embodiments of the present invention through the use of a positioning system such as positioning system 151 (shown in FIG. 1), which may be part of the drone on-board computer 323, combined with positioning sensor 353 (e.g., accelerometers, global positioning system (GPS) sensors, altimeters, etc.). That is, positioning system 151 may use a global positioning system (GPS), which uses space-based satellites that provide positioning signals that are triangulated by a GPS receiver to determine a 3-D geophysical position of the aerial drone 200. Positioning system 151 may also use, either alone or in conjunction with a GPS system, physical movement sensors (i.e., positioning sensor 353) such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 200, the drone on-board computer 323 may utilize radar or other electromagnetic energy that is emitted from an electromagnetic radiation transmitter (e.g., transceiver 307 shown in FIG. 3), bounced off a physical structure (e.g., a building, bridge, or another aerial drone), and then received by an electromagnetic radiation receiver (e.g., transceiver 307). By measuring the time it takes to receive back the emitted electromagnetic radiation, and/or evaluating a Doppler shift (i.e., a change in frequency to the electromagnetic radiation that is caused by the relative movement of the aerial drone 200 to objects being interrogated by the electromagnetic radiation) in the received electromagnetic radiation from when it was transmitted, the presence and location of other physical objects can be ascertained by the drone on-board computer 323.

With respect to the feature of (3) measuring the speed and direction of the aerial drone 200, this is accomplished in one or more embodiments of the present invention by taking readings from an on-board airspeed indicator (not depicted) on the aerial drone 200 and/or detecting movements to the control mechanisms (depicted in FIG. 2) on the aerial drone 200 and/or the positioning system 151 discussed above.

With respect to the feature of (4) providing any other inputs needed to safely control the movement of the aerial drone 200, such inputs include, but are not limited to, control signals to direct the aerial drone 200 to make an emergency landing, etc.

Also on aerial drone 200 in one or more embodiments of the present invention is a camera 326, which is capable of sending still or moving visible light digital photographic images (and/or infrared light digital photographic images) to the drone on-board computer 323. These images can be used to determine the location of the aerial drone 200 (e.g., by matching to known landmarks), to sense other drones/obstacles, and/or to determine speed (by tracking changes to images passing by) of the aerial drone.

Also on aerial drone 200 in one or more embodiments of the present invention are sensors 315. Examples of sensors 315 include, but are not limited to, air pressure gauges, microphones, barometers, chemical sensors, vibration sensors, etc., which detect a real-time operational condition of aerial drone 200 and/or an environment around aerial drone 200. Another example of a sensor from sensors 315 is a light sensor, which is able to detect light from other drones, street lights, home lights, etc., in order to ascertain the environment in which the aerial drone 200 is operating.

Also on aerial drone 200 in one or more embodiments of the present invention are lights 309. Lights 309 are activated by drone on-board computer 323 to provide visual warnings, alerts, etc.

Also on aerial drone 200 in one or more embodiments of the present invention is a speaker 311. Speaker 311 is used by drone on-board computer 323 to provide aural warnings, alerts, etc.

Also on aerial drone 200 in one or more embodiments of the present invention is a microphone 317. In an embodiment, microphone 317 is an omnidirectional sensor that measures ambient noise (e.g., sound produced by the aerial drone 200). In the same or another embodiment, microphone 317 is a directional microphone (e.g., that captures sounds at some distance away from the aerial drone 200).

Also on aerial drone 200 in one or more embodiments of the present invention is a fuel state sensor 319. In an embodiment of the present invention, fuel state sensor 319 (i.e., a fuel level sensor) is a sensor within a liquid or gas fuel tank (e.g., gasoline tank, a compressed gas cylinder, etc.). In another embodiment of the present invention, the fuel state sensor 319 is a battery level indicator (e.g., a voltage sensor) that indicates how much stored electricity remains in the battery 218 shown in FIG. 2. In another embodiment of the present invention, the fuel state sensor 319 is a combination of a liquid/gas fuel sensor and a battery level indicator.

In one or more embodiments of the present invention, the present invention utilizes an aerial drone to deploy a warning sign, which warns oncoming traffic of the presence of a faulty vehicle (i.e., a vehicle that has been involved in an accident, has experienced a mechanical breakdown, has run out of fuel, has an incapacitated driver, is simply "resting", etc.). That is, as used herein in one or more embodiments of the present invention, the term "faulty vehicle" is defined as a vehicle that is not operating in a normal manner in accordance with traffic flow, but rather is stopped on or near a roadway or other travel surface in the potential presence of oncoming moving traffic.

The aerial drone may be a single aerial drone tasked for this mission, or it may be from a group of like-tasked aerial drones that are monitoring conditions at a wide-range area that includes the location of the faulty vehicle.

The aerial drones discussed herein may be private, public, offered for rental, and combinations thereof. They may be perched in various docking stations in a town, country, home, telephone pole, etc., ready to be pre-deployed to specific locations from various staging areas.

Without the present invention, when a car has to stop on the roadside (due to being faulty or even if due to the driver simply needing to pull over for a short period of time to find something in the car, to take a short rest, to wait for another vehicle, etc.), the driver must exit the vehicle in order to place a warning sign (e.g., a red-triangle sign) behind the vehicle. This requires the manual placement of the warning sign at a position that is far enough from the car to allow the drivers of oncoming traffic time to prepare for the unexpected obstacle. Such an operation is hazardous for the driver (due to the perils presented by walking on a dark highway, not being seen by the ongoing traffic, falling on uneven or elevated surfaces, etc.). Furthermore, placing a warning sign on the ground at a fixed location runs the risk of the sign being run over by oncoming traffic, which may lead to a serious accident.

In order to address these and other problems in the prior art, one or more embodiments of the present invention launch/deploy a drone to fly to an optimal position near the faulty vehicle and hover/place the warning sign thereon.

As described herein, in one or more embodiments of the present invention, the aerial drone lands, thus saving fuel. However, if the aerial drone detects an oncoming vehicle that may strike the aerial drone (either while landed or while hovering), the aerial drone will automatically reposition itself, in order avoid being struck by the oncoming vehicle.

As shown in FIG. 2, in one or more embodiments of the present invention the warning sign 226 has an array of lights (e.g., to include light 228), which is more visible, especially at night. Alternatively, such visual highlighting can be provided by reflectors (i.e., reflective material, paint, etc.) that are highly visible at night.

One or more embodiments of the present invention utilize integrated software to control a camera equipped aerial drone. The camera system on the aerial drone is used in the implementation of the automated process to start, orientate and place the aerial drone at an optimal position, thus warning oncoming traffic of the presence of the faulty vehicle.

In one or more embodiments of the present invention, a GPS sensor will be used to calculate the distance to the starting position to guarantee the warning distance and will also be used in addition to the camera system for the orientation.

Figure 4:
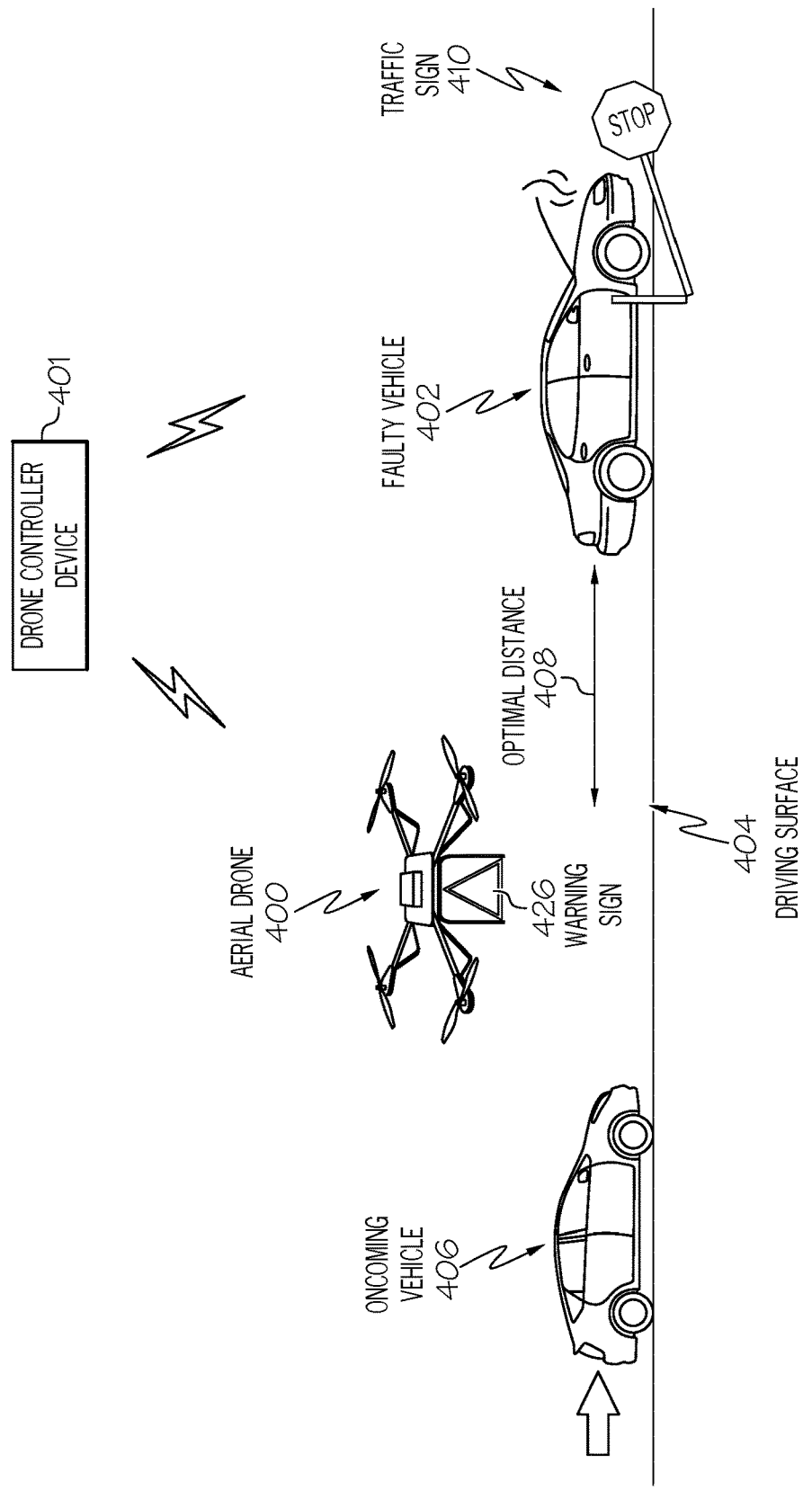
FIG. 4 depicts an exemplary aerial drone being utilized to deploy a sign warning of the presence of a faulty vehicle on a roadway.

With reference now to FIG. 4, assume that a faulty vehicle 402 is stopped on or near a driving surface 404 (e.g., a public roadway, a highway, a parking lot, a driveway, etc.). That is, the faulty vehicle 402 is either on the roadway or on the shoulder of the roadway, thus posing a threat to an oncoming vehicle 406. The present invention flies the aerial drone 400 (analogous to aerial drone 200 shown in FIG. 2), which carries a warning sign 426 (analogous to warning sign 226 shown in FIG. 2) to the location of the faulty vehicle 402. If the fault vehicle 402 (with the attached warning sign 426) is not moving, then the aerial drone 400 positions itself (by hovering or landing) at an optimal position that is the optimal distance 408 away from the faulty vehicle 402.

In an embodiment of the present invention, the faulty vehicle 402 is actually moving, but at a diminished velocity that has been predetermined to pose a hazard to other traffic. That is, assume that faulty vehicle 402 is traveling on the driving surface 404 (or on the shoulder) at only five miles per hour. This slow speed may the maximum speed that the faulty vehicle 402 can move (e.g., due to mechanical problems), or the driver of the faulty vehicle may simply want to drive slowly in order to look at the scenery. In this embodiment, the aerial drone 400 will fly an optimal distance 408 behind the moving faulty vehicle that is either not moving or is traveling very slowly (e.g., five miles per hour).

In one or more embodiments of the present invention, a drone controller device 401 is a system that, using an array of cameras, etc. detects the presence and location of the faulty vehicle 402, and deploys the aerial drone 400 to that location.

In one or more embodiments of the present invention, the aerial drone 400 is pre-positioned or flies in a patrol pattern looking for faulty vehicles. In response to detecting faulty vehicle 402 (e.g., using software that analyzes images from a camera that is on-board aerial drone 400), aerial drone 400 will autonomously deploy itself to the location of the faulty vehicle 402.

While a single aerial drone 400 is depicted in FIG. 4, in one or more embodiments of the present invention multiple aerial drones may deploy multiple warning signs near the faulty vehicle 402. For example, multiple aerial drones may deploy a series of warning signs that guides oncoming traffic onto a safe lane around the faulty vehicle 402.

Figure 5:
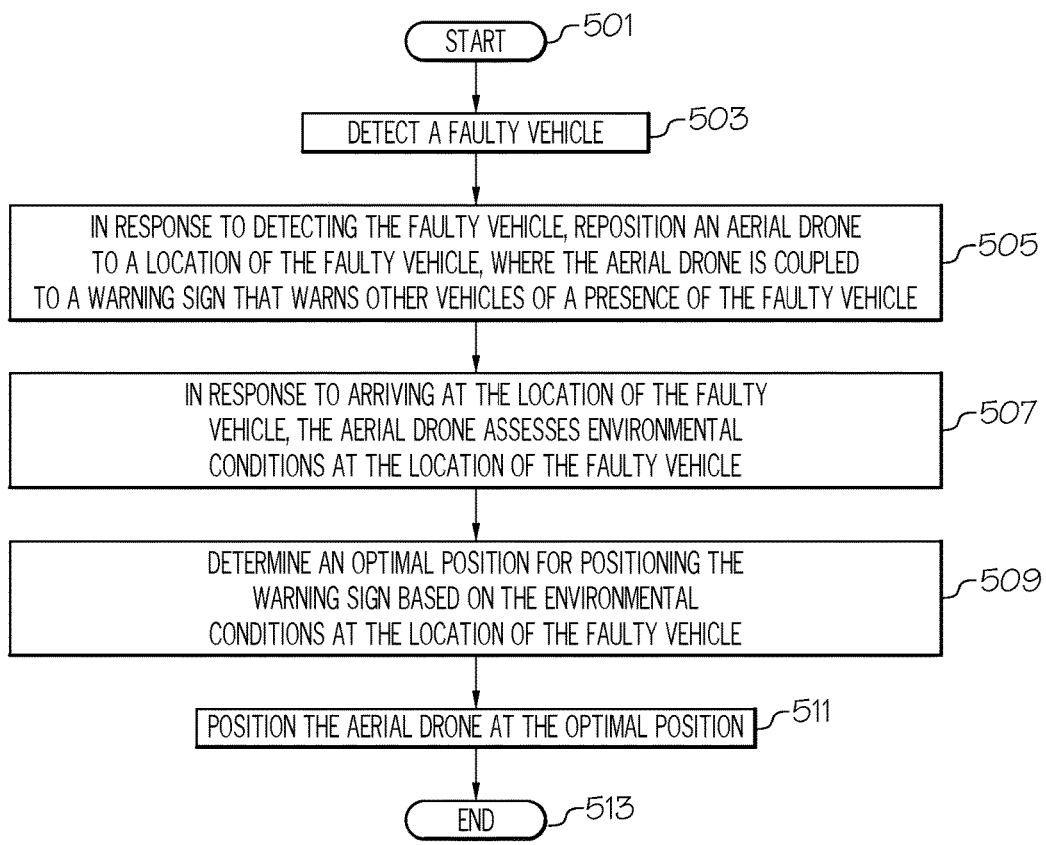
FIG. 5 is a high-level flow chart of one or more steps performed by one or more computing devices and/or an aerial drone and/or other hardware devices to deploy a sign warning of the presence of a faulty vehicle in accordance with one or more embodiments of the present invention.

With reference now to FIG. 5, a high-level flow chart of one or more steps performed by one or more computing and/or other devices to pre-position an aerial drone in accordance with one or more embodiments of the present invention is presented.

After initiator block 501, one or more processors (within drone on-board computer 223 shown in FIG. 2 and/or drone controller device 401 shown in FIG. 4) detect a faulty vehicle, as described in block 503. For example, camera 219 shown in FIG. 2 may send images of faulty vehicle 402 either stopped or else traveling at a very slow speed (e.g., 10 miles per hour) on or next to a roadway. These images are sent to the processors, where they are interpreted to recognize the presence and location of the faulty vehicle 402 shown in FIG. 4.

With reference to block 505 shown in FIG. 5, the processor(s), in response to detecting the faulty vehicle, reposition an aerial drone (e.g., aerial drone 400 shown in FIG. 4) to a location of the faulty vehicle (as depicted in FIG. 4). As described in FIG. 2, in one or more embodiments of the present invention the aerial drone is coupled to a warning sign (e.g., warning sign 226 shown in FIG. 2) that warns other vehicles (e.g., oncoming vehicle 406 shown in FIG. 4) of the presence of the faulty vehicle.

As described in block 507, in response to arriving at the location of the faulty vehicle, the aerial drone assesses environmental conditions at the location of the faulty vehicle. As described herein, these "environmental conditions" may be current traffic conditions at the location of the faulty vehicle; current weather conditions at the location of the faulty vehicle; current ambient lighting conditions at the location of the faulty vehicle; etc.

As described in block 509, the processor(s) (either within the aerial drone 400 or within the drone controller device 401 shown in FIG. 4) determine an optimal position for positioning the warning sign based on the environmental conditions at the location of the faulty vehicle. That is and as shown in FIG. 4, this optimal position may be the optimal distance 408 away from the faulty vehicle 402.

As described in block 511, the processor(s) then position the aerial drone at the optimal position, as shown in FIG. 4.

The flow-chart ends at terminator block 513.

In an embodiment of the present invention and as described herein, the faulty vehicle is moving at a diminished velocity (e.g., less than 10 miles per hour on a highway) that has been predetermined to cause a hazard to the other vehicle. In this embodiment, the optimal position is a moving position that moves along with the faulty vehicle traveling at the diminished velocity. Thus, the aerial drone flies/moves the warning sign at the dynamically moving position while the faulty vehicle is moving at the diminished velocity. That is, the warning sign (attached to the aerial drone) flies along behind the slow-moving vehicle. This capability is not available to a fixed sign. Similarly, this capability is not available to another vehicle that has a warning sign attached to its rear, since the other vehicle is not able to determine and compensate for environmental conditions at the location of the slow-moving vehicle.

In an embodiment of the present invention, assume that the warning sign remains affixed to the aerial drone while positioned at the optimal position (which position may be fixed or moving). As described in FIG. 4, oncoming vehicle 406 may be on a collision course with aerial drone 400. However, rather than simply moving the aerial drone 400 out of the way of the oncoming vehicle 406 with no regard for where the aerial drone 400 moves (other than getting out of the way of the oncoming vehicle), the system predetermines a secondary position for the aerial drone 400 that still provides a warning to the oncoming vehicle 406 (and/or other oncoming traffic) as to the presence of the faulty vehicle 402. Thus, in this embodiment, one or more processors (within the drone controller device 401 and/or the aerial drone 400) determine a secondary position for positioning the warning sign based on the environmental conditions at the location of the faulty vehicle. The aerial drone detects the oncoming vehicle. One or more processors (within the drone controller device 401 and/or the aerial drone 400) determine that the oncoming vehicle is on a collision course with the aerial drone. In response to determining that the oncoming vehicle is on the collision course with the aerial drone, the processor(s) reposition the aerial drone to the secondary position (i.e., the processor(s) send instructions to the drone mechanisms controller 301 shown in FIG. 3).

In an embodiment of the present invention, the drone on-board computer 323 monitors sensor readings from the fuel state sensor 319 shown in FIG. 3. If the fuel (gas, liquid, electric) level falls below some predefined level, then the drone on-board computer will land the aerial drone at the optimal position behind the faulty vehicle (assuming that the faulty vehicle is not moving). However, as long as the fuel level remains above some predefined level (which may or may not be the same level used to decide to land the aerial drone), then the drone on-board computer keeps the aerial drone hovering (flying) at the optimal position.

In an embodiment of the present invention, the aerial drone is pre-positioned according to a history of vehicles breaking down or otherwise demonstrating faulty characteristics at certain locations and at certain time. For example, assume that driving surface 404 shown in FIG. 4 is a mountain highway. Assume that there is a historically high incidence of vehicles losing control on a specific curve, particularly during a particular month (e.g., January) and/or during a certain time of day (e.g., between midnight and 1:00 AM) and/or on a certain day of the week (e.g., Saturdays). The drone controller device 401 (or the aerial drone 400 itself) will pre-position the aerial drone 400 at this specific curve at the particular date/time.

Thus, in an embodiment of the present invention, the faulty vehicle is on a roadway, and one or more processors (within drone controller device 401 and/or aerial drone 400 shown in FIG. 4) retrieve a record of faulty vehicle incidents on the roadway, where the record describes a frequent occurrence (e.g., the most frequent occurrence level or a frequency above a certain level) of faulty vehicle incidents at a specific location on the roadway at a particular time and day of a week (and/or at a particular recurring annual date, such as every January 1). The processor(s) then pre-position the aerial drone at the specific location on the roadway at a particular time and day of the week (and/or at the particular recurring annual date).

In an embodiment of the present invention, the aerial drone 400 temporarily replaces a damaged traffic sign. For example, assume that faulty vehicle 402 (or another vehicle that has previously driven along driving surface 404) has collided with traffic sign 410, causing traffic sign 410 to be damaged (e.g., knocked down, as shown in FIG. 4). The aerial drone 400 is initially positioned at an optimal position on the roadway to warn oncoming vehicles that faulty vehicle 402 is a potential hazard. During the time that aerial drone 400 is deployed to warn other oncoming vehicles regarding the presence of faulty vehicle 402, faulty vehicle 402 may be towed or otherwise moved out of the roadway, which decreases or eliminates the road hazard posed by faulty vehicle 402. However, aerial drone 400, instead of returning to its docking area and/or leaving the area, may stay on station in order to warn other vehicles of the danger posed by the missing/damaged traffic sign 410. Thus in one or more embodiments, warning sign 426 may be a general warning sign that warns of a hazard, regardless of what the hazard is (e.g., a disabled vehicle, an icy roadway, a missing traffic sign, etc.) In one or more embodiments, aerial drone 400 uses camera 326 shown in FIG. 3 1) to recognize the damaged/missing traffic sign 410, and 2) to move the aerial drone 400 to a position that is at or near the original location of damaged/missing traffic sign 410, thus temporarily taking the place of the damaged/missing traffic sign 410 until it is repaired.

In an embodiment of the present invention, the drone controller device 401 and/or the aerial drone 400 detect current weather/traffic conditions at a particular location on the roadway. If such weather/traffic conditions reach a certain predefined state (e.g., the weather is snowy, traffic is heavy, etc.), then the aerial drone 400 is pre-positioned at this particular location. Thus, in one or more embodiments of the present invention, assume that the faulty vehicle is on a roadway. One or more processors (e.g., within the drone controller device 401 shown in FIG. 4) retrieve an indication of current environmental conditions at a specific location on the roadway. That is, the drone controller device 401 may receive video stream images, thermometer readings, traffic sensor readings, etc. that identify current lighting conditions and/or weather conditions and/or temperature conditions and/or moisture conditions and/or traffic conditions at this specific location on the roadway. If the conditions exceed some predefined parameters at this particular location (e.g., a curve) (e.g., the temperature is below freezing, the curve is wet or snowy, the curve is dark, traffic is heavy (more than a predefined number of vehicle pass the curve with a certain time, such as 20 vehicles per minute), etc., then the processor(s) pre-position the aerial drone at the specific location on the roadway based on the current environmental conditions at the specification location on the roadway.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
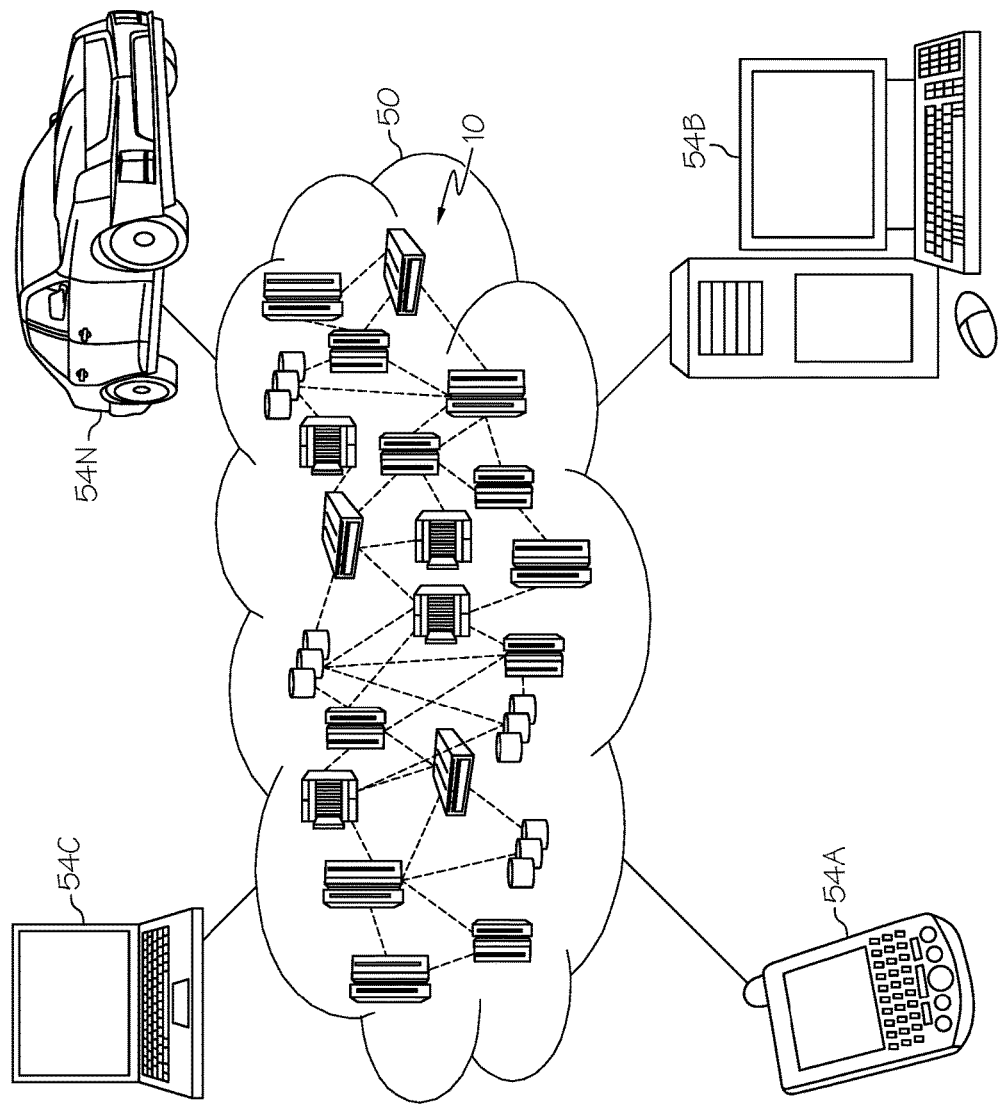
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
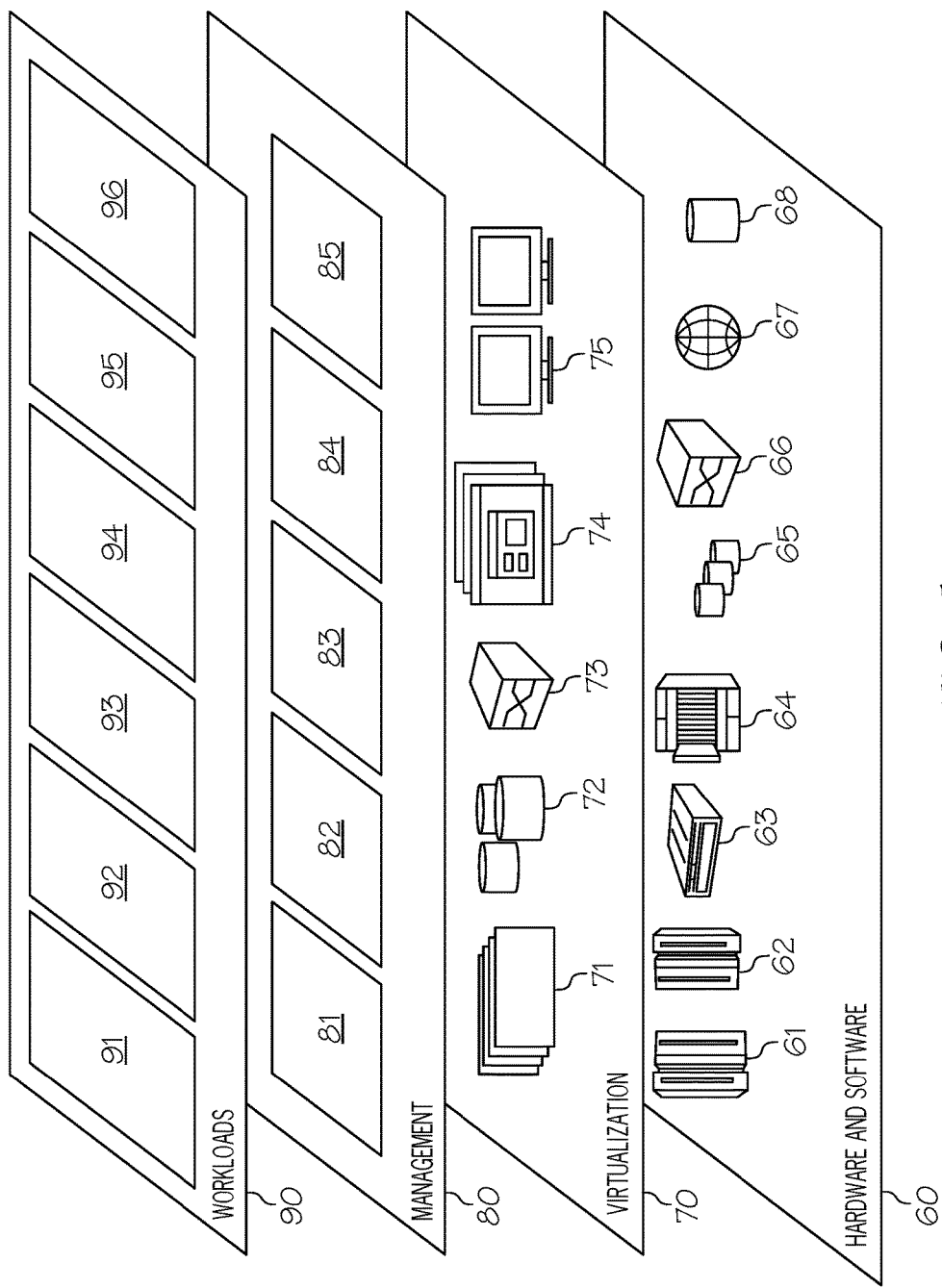
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drone control 96 for performing one or more functions in accordance with the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
pre-positioning an aerial drone on an immovable docking station;
detecting, by one or more processors, a faulty vehicle;
deploying, by one or more processors, the aerial drone from the immovable docking station to a location of the faulty vehicle, wherein the aerial drone is coupled to a warning sign that warns other vehicles of a presence of the faulty vehicle in response to detecting the faulty vehicle, and wherein the aerial drone is deployed to the location of the faulty vehicle by flying the aerial drone from the immovable docking station to the location of the faulty vehicle;
assessing, by the aerial drone, environmental conditions at the location of the faulty vehicle in response to said deploying the aerial drone to the location of the faulty vehicle;
determining, by one or more processors, an optimal position for positioning the warning sign based on the environmental conditions at the location of the faulty vehicle; and
positioning, by one or more processors, the aerial drone to the optimal position;
detecting, by the aerial drone, that the faulty vehicle has damaged a traffic sign;
in response to detecting that the faulty vehicle has damaged the traffic sign, determining, by one or more processors, that the optimal position is a location of the damaged traffic sign; and
positioning, by one or more processors, the aerial drone at the location of the damaged traffic sign until the damaged traffic sign is repaired.

2. The computer-implemented method of claim 1, wherein the faulty vehicle is moving at a diminished velocity that has been predetermined to cause a hazard to the other vehicles, wherein the optimal position is a moving position that moves along with the faulty vehicle traveling at the diminished velocity, and wherein the aerial drone flies the warning sign at the moving position while the faulty vehicle is moving at the diminished velocity.

3. The computer-implemented method of claim 1, wherein the environmental conditions are current traffic conditions at the location of the faulty vehicle.

4. The computer-implemented method of claim 1, wherein the environmental conditions are current weather conditions at the location of the faulty vehicle.

5. The computer-implemented method of claim 1, wherein the environmental conditions are current ambient lighting conditions at the location of the faulty vehicle.

6. The computer-implemented method of claim 1, wherein the warning sign remains affixed to the aerial drone while the aerial drone flies above the faulty vehicle at the optimal position, and wherein the computer-implemented method further comprises:
determining, by one or more processors, a secondary position for positioning the warning sign based on the environmental conditions at the location of the faulty vehicle;
detecting, by the aerial drone, an oncoming vehicle;
determining, by one or more processors, that the oncoming vehicle is on a collision course with the aerial drone; and
in response to determining that the oncoming vehicle is on the collision course with the aerial drone, repositioning, by one or more processors, the aerial drone to the secondary position.

7. The computer-implemented method of claim 1, further comprising:
- receiving, by one or more processors, a fuel gauge reading from a fuel state sensor on the aerial drone; and
- in response to determining that the fuel gauge reading is below a predefined level, landing, by one or more processors, the aerial drone at the optimal position.

8. The computer-implemented method of claim 1, further comprising:
- receiving, by one or more processors, a fuel gauge reading from a fuel state sensor on the aerial drone; and
- in response to determining that the fuel gauge reading is above a predefined level, hovering the aerial drone at the optimal position.

9. The computer-implemented method of claim 1, wherein the faulty vehicle is on a roadway, and wherein the computer-implemented method further comprises:
- retrieving, by one or more processors, a record of faulty vehicle incidents on the roadway, wherein the record describes a most frequent occurrence of faulty vehicle incidents at a specific location on the roadway at a particular time and day of a week; and
- pre-positioning, by one or more processors, the aerial drone at the specific location on the roadway at a particular time and day of the week.

10. The computer-implemented method of claim 1, wherein the faulty vehicle is on a roadway, and wherein the computer-implemented method further comprises:
- retrieving, by one or more processors, a record of faulty vehicle incidents on the roadway, wherein the record describes a most frequent occurrence of faulty vehicle incidents at a specific location on the roadway at a particular recurring annual date; and
- pre-positioning, by one or more processors, the aerial drone at the specific location on the roadway at the particular recurring annual date.

11. The computer-implemented method of claim 1, wherein the faulty vehicle is on a roadway, and wherein the computer-implemented method further comprises:
- retrieving, by one or more processors, an indication of current environmental conditions at a specific location on the roadway; and
- pre-positioning, by one or more processors, the aerial drone at the specific location on the roadway based on the current environmental conditions at the specific location on the roadway.

12. The computer-implemented method of claim 1, further comprising:
- flying the aerial drone in a patrol pattern;
- searching for, by the aerial drone, the faulty vehicle while flying in the patrol pattern;
- in response to detecting the faulty vehicle while flying in the patrol pattern, identifying, by the aerial drone, the location of the faulty vehicle; and
- flying the aerial drone to the location of the faulty vehicle.

13. A computer program product for positioning a warning sign with an aerial drone, the computer program product comprising a computer readable storage medium having program instructions embodied therewith, wherein the computer readable storage medium is not a transitory signal per se, the program instructions readable and executable by a processor to cause the processor to perform a method comprising:
- pre-positioning an aerial drone on an immovable docking station;
- detecting a faulty vehicle;
- in response to detecting the faulty vehicle, deploying the aerial drone from the immovable docking station to a location of the faulty vehicle, wherein the aerial drone is coupled to a warning sign that warns other vehicles of a presence of the faulty vehicle, and wherein the aerial drone is deployed to the location of the faulty vehicle by flying the aerial drone from the immovable docking station to the location of the faulty vehicle;
- in response to the aerial drone arriving at the location of the faulty vehicle, assessing environmental conditions at the location of the faulty vehicle;
- determining an optimal position for positioning the warning sign based on the environmental conditions at the location of the faulty vehicle;
- positioning the aerial drone to the optimal position;
- detecting, by the aerial drone, that the faulty vehicle has damaged a traffic sign;
- in response to detecting that the faulty vehicle has damaged the traffic sign, determining, by one or more processors, that the optimal position is a location of the damaged traffic sign; and
- positioning, by one or more processors, the aerial drone at the location of the damaged traffic sign until the damaged traffic sign is repaired.

14. The computer program product of claim 13, wherein the warning sign remains affixed to the aerial drone while positioned at the optimal position, and wherein the method further comprises:
- determining a secondary position for positioning the warning sign based on the environmental conditions at the location of the faulty vehicle;
- detecting an oncoming vehicle;
- determining that the oncoming vehicle is on a collision course with the aerial drone; and
- in response to determining that the oncoming vehicle is on the collision course with the aerial drone, repositioning the aerial drone to the secondary position.

15. The computer program product of claim 13, wherein the method further comprises:
- receiving a fuel gauge reading from a fuel state sensor on the aerial drone; and
- in response to determining that the fuel gauge reading is above a predefined level, hovering the aerial drone at the optimal position.

16. The computer program product of claim 13, wherein the program instructions are provided as a service in a cloud environment.

17. A computer system comprising:
- one or more processors,
- one or more computer readable memories communicably coupled to the one or more processors, and
- program instructions stored on at least one of the one or more computer readable memories for execution by at least one of the one or more processors via at least one of the one or more computer readable memories, the stored program instructions comprising:
  - program instructions to pre-position an aerial drone on an immovable docking station;
  - program instructions to detect a faulty vehicle;
  - program instructions to, in response to detecting the faulty vehicle, deploy the aerial drone to a location of the faulty vehicle, wherein the aerial drone is coupled to a warning sign that warns other vehicles of a presence of the faulty vehicle, and wherein the aerial drone is deployed to the location of the faulty vehicle by flying the aerial drone from the immovable docking station to the location of the faulty vehicle;

program instructions to, in response to the aerial drone arriving at the location of the faulty vehicle, assess, by the aerial drone, environmental conditions at the location of the faulty vehicle;

program instructions to determine an optimal position for positioning the warning sign based on the environmental conditions at the location of the faulty vehicle;

program instructions to position the aerial drone to the optimal position;

program instructions to detect that the faulty vehicle has damaged a traffic sign;

program instructions to, in response to detecting that the faulty vehicle has damaged the traffic sign, determine that the optimal position is a location of the damaged traffic sign; and program instructions to position the aerial drone at the location of the damaged traffic sign until the damaged traffic sign is repaired.

18. The computer system of claim 17, wherein the environmental conditions are current traffic conditions at the location of the faulty vehicle.

19. The computer system of claim 17, wherein the environmental conditions are current weather conditions at the location of the faulty vehicle.

* * * * *